United States Patent
Deutsch et al.

(10) Patent No.: US 7,961,388 B1
(45) Date of Patent: Jun. 14, 2011

(54) INFLATABLE SCREEN WITH SUPPORT STRUCTURE

(75) Inventors: Robert Deutsch, Rockville, MD (US); Shane Spruill, Silver Spring, MD (US)

(73) Assignee: Deutsch Inc., Rockville, MD (US)

(*) Notice: Subject to any disclaimer, the term of this patent is extended or adjusted under 35 U.S.C. 154(b) by 0 days.

(21) Appl. No.: 12/794,989

(22) Filed: Jun. 7, 2010

(51) Int. Cl.
*G03B 21/56* (2006.01)
(52) U.S. Cl. .................................. 359/443; 248/694
(58) Field of Classification Search ............ 359/443, 359/449; 40/610; 248/693–694, 548
See application file for complete search history.

(56) References Cited

U.S. PATENT DOCUMENTS

| | | | | |
|---|---|---|---|---|
| 4,022,522 | A * | 5/1977 | Rain | 359/443 |
| 6,008,938 | A | 12/1999 | Suehle | |
| 7,181,877 | B2 * | 2/2007 | Quade | 40/610 |
| 7,213,357 | B2 * | 5/2007 | Scherba | 40/610 |
| 7,446,937 | B2 | 11/2008 | Poretskin | |
| 2005/0166433 | A1 * | 8/2005 | Barlow | 40/610 |
| 2008/0231815 | A1 * | 9/2008 | Ganzevoort | 353/79 |
| 2010/0007949 | A1 | 1/2010 | Clawson | |

* cited by examiner

*Primary Examiner* — Christopher Mahoney

(57) ABSTRACT

An inflatable device is provided including an inflatable framework for a projection screen or imaging surface wherein an additional support structure provides increased stability for the inflatable framework and the screen while avoiding contact or interference with the screen or imaging surface, thereby limiting screen distortion.

10 Claims, 3 Drawing Sheets

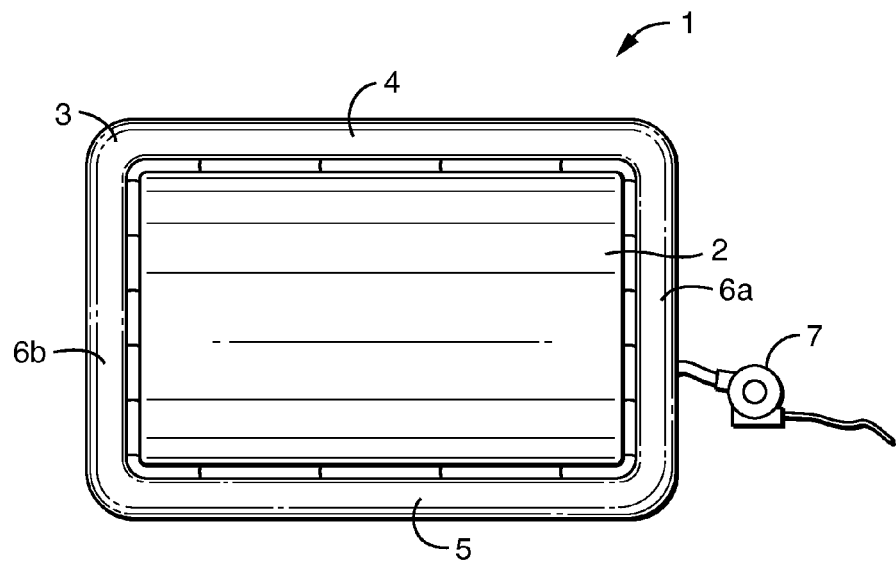
FIG. 1
(PRIOR ART)
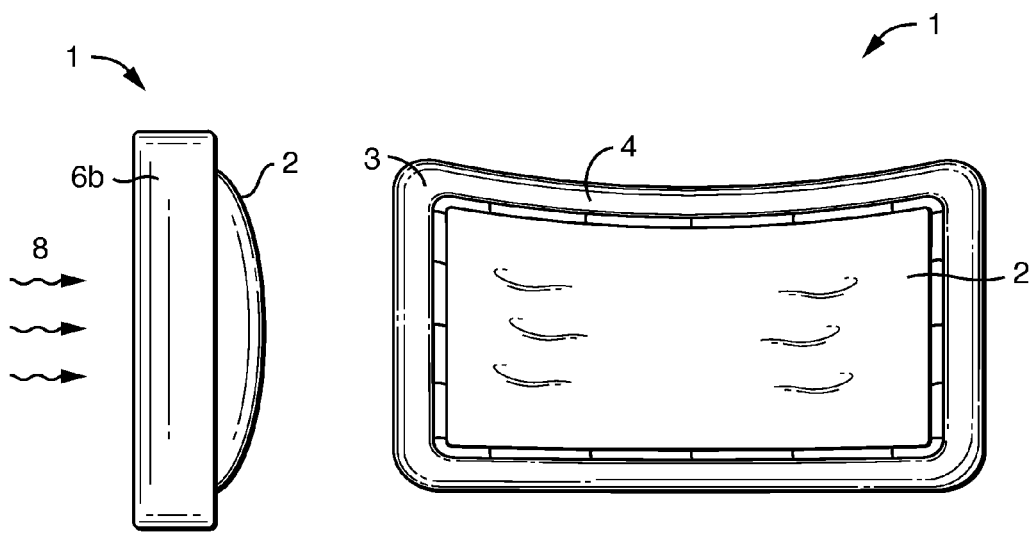
FIG. 2A
(PRIOR ART)
FIG. 2B
(PRIOR ART)

INFLATABLE SCREEN WITH SUPPORT STRUCTURE

CROSS-REFERENCE TO RELATED APPLICATIONS

None.

STATEMENT REGARDING FEDERALLY SPONSORED RESEARCH OR DEVELOPMENT

Not applicable.

FIELD OF THE INVENTION

This invention relates to inflatable devices that hold or include projection or imaging screens.

BACKGROUND OF THE INVENTION

Inflatable structures used with projection or imaging screens are known in the art. United States Patent Publication 20100007949 and U.S. Pat. No. 7,446,937 describe examples of inflatable screens. Inflatable screen devices can be quite large and are often used in outdoor environments. Therefore, the stability of inflatable screens is important.

Inflatable screen devices generally include an inflatable framework that is used to hold up and secure the screen surface. The inflatable structure may be held to the ground by guy wires or tethers that run from the inflatable structure to anchor points on or in the ground or ballast. This prevents the inflatable structure from moving along the ground or falling. However, the screen surface and/or framework may bend, curve, or bow due to structural design, large size, torsion (i.e., when the weight is different on the front and back of structure), and the influence of wind. It is highly desirable for the screen projection surface to remain flat and rectangular during use so that the projected images appearing on the screen are not distorted. Prior art attempts to keep screen projection surfaces flat and rectangular during use have included structural elements, such as one or more support columns centered or distributed vertically in the framework. In the prior art, these elements have been placed in or close to the plane of the framework and the projection screen surface to reduce some of the displacement of the framework and screen due to wind or other forces. In the prior art designs, the screen surface may come into contact with such a support structure as the wind pushes against the screen from the front, which can cause visually apparent distortion of the projection screen surface and projected images.

Thus, a need exists for a support mechanism for inflatable screen devices that reduces displacement and distortion of the framework and projection screen surface due to wind or other forces while minimizing interference with the screen when the wind pushes against the screen surface from the front.

SUMMARY OF THE INVENTION

An object of the present invention is to provide an additional support structure for an inflatable device for holding up a projection screen surface comprising an inflatable framework on which a projection screen for images is held, wherein the additional support structure attaches to upper and lower portions of the inflatable framework such that displacement of the framework and screen due to the wind will be reduced and wherein the additional support mechanism bends, curves, or angles away from the plane of the screen and the inflatable framework in the area of the screen.

It is a further object of the invention to provide one or more additional support structures that are inflatable.

It is a further object of the invention that the additional support structure(s) has an air bladder that is separate from air bladders of the inflatable framework.

It is a further object of the invention that air pressure within the air bladder of the additional support structure(s) can be varied to adjust for different or changing environmental and other conditions.

BRIEF DESCRIPTION OF THE DRAWINGS

FIG. 1 is a perspective view of a prior art inflatable device and screen.

FIG. 2a is a side view of a prior art inflatable device and screen under the influence of wind.

FIG. 2b is a perspective view of a prior art inflatable device and screen under the influence of wind.

DETAILED DESCRIPTION OF PREFERRED EMBODIMENTS

Figure 3:
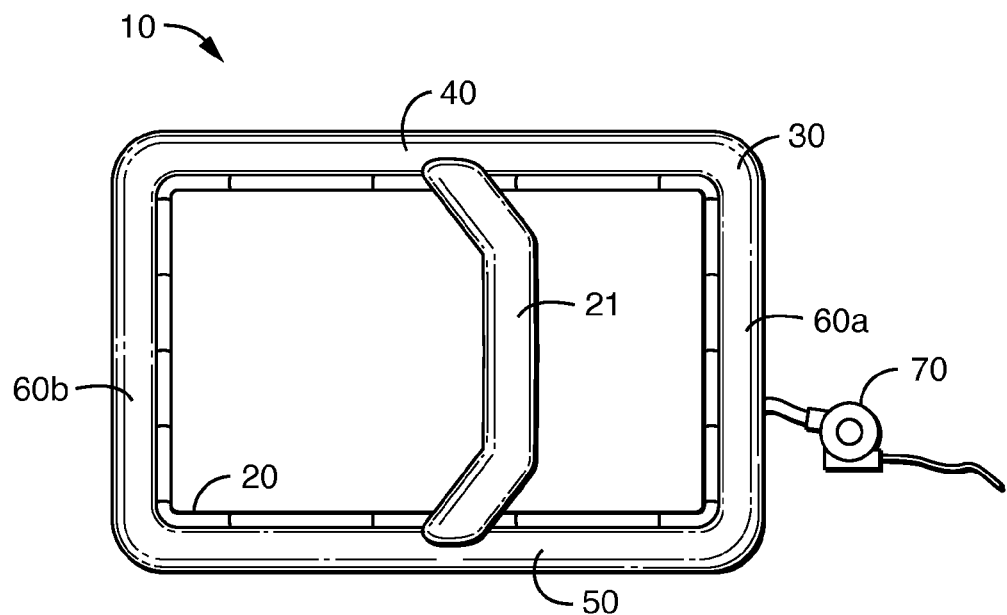
FIG. 3 is a perspective view of an embodiment of the invention.

FIG. 1 shows an inflatable device 1 for showing images on a screen 2 according to the prior art. The inflatable device 1 can be erected on a temporary basis in indoor or outdoor environments. The inflatable device 1 includes an inflatable framework 3 that can include a top 4, bottom 5, and side (6a, 6b) portions. A blower 7 is used to inflate the framework 3 and a series of guy wires (not shown) can be attached to the framework 3 in order to hold the framework 3 in place. The screen 2 is attached to the framework 3 by any suitable means that are designed to stretch the screen 2 and hold the screen 2 in a flat position. Once the framework 3 is fully inflated and secured, a movie, video, or other images can be displayed on the screen 2.

FIG. 2a shows prior art inflatable device 1 under the influence of a wind 8 blowing into the back of inflatable device 1, causing the screen 2 to billow and be displaced out of the plane of the framework 3. FIG. 2b shows prior art inflatable device 1 under the influence of wind 8 blowing into the back of inflatable device 1, causing the screen 2 to be displaced forwardly out of the plane of the framework 3 and causing top portion 4 of the framework to bend downward. The displacement of the screen 2 and top portion 4 of the framework 3 is undesirable as it can cause distortion of the images shown on the screen 2.

FIG. 3 depicts an embodiment of the present invention. The framework 30 of inflatable device 10 can be made of plastic vinyl material or other suitable material that can be sewn or heat welded together. The framework 30 is inflated using a blower 70 or other known method of inflation. Framework 30 comprises a top 40, bottom 50, and side (60a, 60b) portions. A screen 20 can be attached to framework 30 and stretched flat. A series of guy wires (not shown) can be attached to framework 30 in order to hold it in place during inflation and after inflation.

Figure 4:
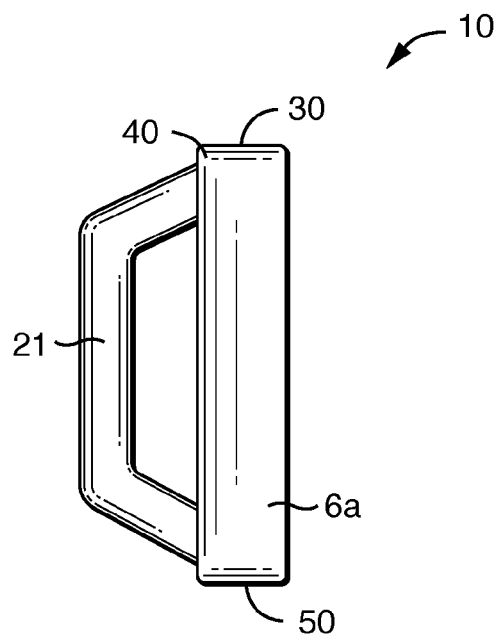
FIG. 4 is a side view of an embodiment of the invention.

FIG. 3 also shows an additional support structure 21. Support structure 21 can be attached, by heat welding, sewing, hook and loop fastener or other suitable means, to top portion 40 on one end and at the other end to bottom portion 50 of framework 30 of inflatable device 10. The attachment mechanism can be reversible or more permanent. Support structure 21 can be made of plastic vinyl or other suitable materials. Support structure 21 is shaped such that it bends, curves, arches, or angles so that support structure 21 generally avoids the plane formed by the framework 30 in which screen 20 resides. FIG. 4 provides a side view of an example of an embodiment in which support structure 21 angles away from framework 30 near the top 40 and bottom 50 portions. The shape of support structure 21 is also designed so that it can function to square the framework 30 by supporting top portion 40 when the force of wind on screen 20 might otherwise cause top portion 40 to bend downward or bend downward more. Such support is provided by support structure 21 whether the wind is blowing from the front or rear of the inflatable device 10.

In a preferred embodiment, support structure 21 is an inflatable structure that has an air bladder that is separate from any air bladders of framework 30. In this manner, the air pressure in support structure 21 can be adjusted for the conditions. For example, an increase in wind speed could create a greater downward force on top portion 40. An increase in the air pressure in support structure 21 would tend to create an upward force against top portion 40 that could counteract the downward force caused by the wind and keep the framework 30 more square, which would also reduce the amount that screen 20 is displaced.

Figure 5:
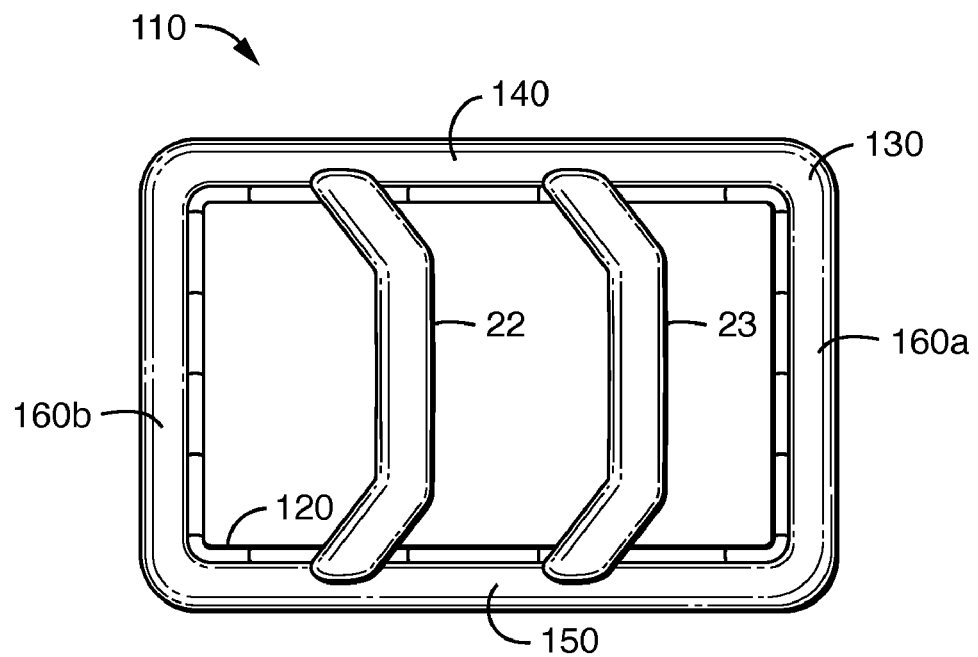
FIG. 5 is a perspective view of another embodiment of the invention.
Figure 6:
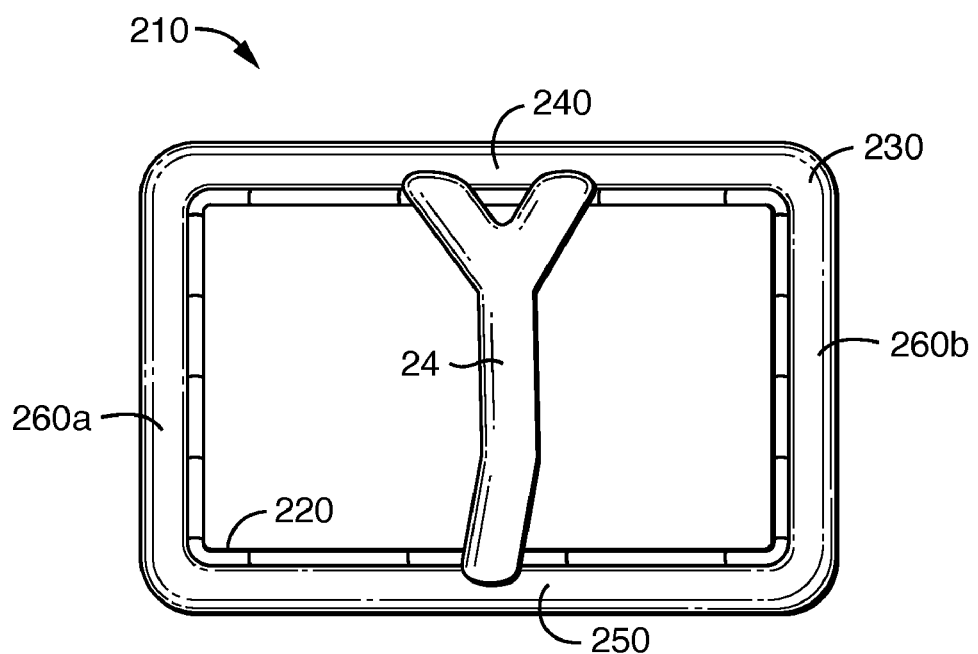
FIG. 6 is a perspective view of another embodiment of the invention.

In addition, more than one of the support structures of the present invention can be used to provide support for the framework, as shown for example in structures 22 and 23 of FIG. 5. Further in addition, variations on the shapes of the support structures can be used provided the structure serves the function of squaring the framework and generally avoids the plane of the screen. In FIG. 6, for example, a "Y" shaped support structure 24 is shown.

The invention claimed is:

1. A device for holding up a projection screen for displaying images comprising:
   an inflatable framework including at least a top portion, a bottom portion, and side portions wherein a screen can be attached to the inflatable framework such that the screen is generally flat and forms a plane; and
   a support structure attached, on a side of the framework opposite a side from which an image projected on the screen would be viewed, at an upper attachment point to the top portion of the inflatable framework near the plane of the screen and at a lower attachment point to the bottom portion of the inflatable framework near the plane of the screen, wherein the support structure between the upper attachment point and the lower attachment point generally avoids the plane of the screen and is substantially held up by the top portion and the bottom portion of the framework.

2. The device of claim 1 wherein the support structure is inflatable.

3. The device of claim 2 wherein the support structure has an air bladder that is separate from air bladders of the inflatable framework.

4. The device of claim 3 wherein air pressure within the air bladder of the support structure can be adjusted in response to changed conditions.

5. The device of claim 3 including two or more support structures.

6. The device of claim 1 including two or more support structures.

7. The device of claim 1 wherein the support structure is branched such that the support structure attaches to the top portion of the inflatable framework at more than one location.

8. The device of claim 1 wherein the support structure is branched such that the support structure attaches to the bottom portion of the inflatable framework at more than one location.

9. A device for holding up a projection screen surface for displaying images comprising:
   an inflatable framework including at least a top portion, a bottom portion, and side portions wherein a screen can be attached to the inflatable framework such that the screen is generally flat and forms a plane; and
   a generally C-shaped support structure attached to the top portion and bottom portion of the inflatable framework on a back side of the framework opposite of a front side from which an image projected on the screen would be viewed, wherein the support structure generally avoids the plane of the screen and serves to reduce displacement of the top portion of the inflatable framework when a force is exerted against the screen and framework.

10. A device for holding up a projection screen surface for displaying images comprising:
    an inflatable framework including at least a top portion, a bottom portion, and side portions wherein a screen can be attached to the inflatable framework such that the screen is generally flat and forms a plane; and
    a support structure attached to the top portion and bottom portion of the inflatable framework on a back side of the framework opposite of a front side from which an image projected on the screen would be viewed, wherein the support structure, when attached to the inflatable structure, includes a lower portion that angles upwardly away from the inflatable framework, an upper portion that angles downwardly away from the inflatable framework, and a middle portion that runs approximately parallel with the plane of the screen whereby the support structure generally avoids the plane of the screen and serves to reduce displacement of the top portion of the inflatable framework when a force is exerted against the screen and framework.

* * * * *